(12) United States Patent
Blazer et al.

(10) Patent No.: US 9,389,382 B2
(45) Date of Patent: Jul. 12, 2016

(54) FIBER OPTIC RIBBON CABLE AND RIBBON

(71) Applicant: Corning Optical Communications LLC, Hickory, NC (US)

(72) Inventors: Bradley Jerome Blazer, Granite Falls, NC (US); Kimberly Dawn Slan, Ft. Worth, TX (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 0 days.

(21) Appl. No.: 14/459,624

(22) Filed: Aug. 14, 2014

(65) Prior Publication Data

US 2015/0346445 A1     Dec. 3, 2015

Related U.S. Application Data

(60) Provisional application No. 62/006,950, filed on Jun. 3, 2014.

(51) Int. Cl.
  *G02B 6/44* (2006.01)

(52) U.S. Cl.
  CPC .................................. *G02B 6/4403* (2013.01)

(58) Field of Classification Search
  None
  See application file for complete search history.

(56) References Cited

U.S. PATENT DOCUMENTS

| | | | |
|---|---|---|---|
| 4,158,104 A | 6/1979 | Ross | |
| 4,559,411 A | 12/1985 | Piper | |
| 5,682,454 A | 10/1997 | Gaillard | 385/114 |
| 6,584,257 B1 | 6/2003 | Hurley et al. | 385/109 |
| 6,760,523 B2 | 7/2004 | Nechitailo | |
| 7,116,872 B2* | 10/2006 | Okuno | G02B 6/02004 385/114 |
| 7,187,830 B2 | 3/2007 | Blazer | 385/114 |
| 7,231,119 B2* | 6/2007 | Rhoney | G02B 6/4494 385/100 |
| 7,308,175 B1 | 12/2007 | Jackman et al. | |
| 7,397,993 B1* | 7/2008 | Nave | G02B 6/4403 174/117 F |
| 7,599,589 B2 | 10/2009 | Overton et al. | |
| 8,369,668 B1 | 2/2013 | McNutt et al. | |
| 8,412,014 B2 | 4/2013 | Sato et al. | 385/114 |

(Continued)

FOREIGN PATENT DOCUMENTS

| | | | | |
|---|---|---|---|---|
| CN | 103608710 A | 2/2014 | | G02B 6/44 |
| CN | 103858041 A | 6/2014 | | G02B 6/44 |

(Continued)

OTHER PUBLICATIONS

Patent Cooperation Treaty, International Search Report for PCT/US2015/033563, mail date Sep. 30, 2015, 14 pages.

*Primary Examiner* — John M Bedtelyon
(74) *Attorney, Agent, or Firm* — William D. Doyle

(57) ABSTRACT

A fiber optic ribbon cable includes a jacket having a cavity and a stack of fiber optic ribbons in the cavity. Each of the fiber optic ribbons includes optical fibers arranged side-by-side with one another and bound to one another with a common matrix in bound sections of the respective fiber optic ribbon. Each fiber optic ribbon additionally has loose sections thereof where the optical fibers of the respective fiber optic ribbon are loose and unbound. The bound sections are spaced apart from one another and separated from one another by the loose sections, while matrix of each of the bound sections contiguously extends across each of the optical fibers of the fiber optic ribbon. Bound sections of adjoining fiber optic ribbons of the stack are at least partially non-overlapping one another as arranged in the stack, which facilitates flexibility and compactness of the stack.

20 Claims, 3 Drawing Sheets

(56) References Cited

U.S. PATENT DOCUMENTS

| | | | |
|---|---|---|---|
| 8,548,294 B2 | 10/2013 | Toge et al. | 385/114 |
| 8,787,718 B2 | 7/2014 | Tanabe et al. | 385/114 |
| 2010/0296781 A1 | 11/2010 | Sato et al. | 385/114 |
| 2011/0110635 A1 | 5/2011 | Toge et al. | 385/102 |
| 2013/0022325 A1 | 1/2013 | Kachmar | 385/114 |
| 2013/0084047 A1 | 4/2013 | Baucom et al. | |
| 2013/0126232 A1 | 5/2013 | Sakuma | |
| 2013/0156390 A1* | 6/2013 | Matsuzawa | G02B 6/4404 385/114 |
| 2014/0112631 A1 | 4/2014 | Namazue et al. | 385/114 |

FOREIGN PATENT DOCUMENTS

| | | | | |
|---|---|---|---|---|
| CN | 103890628 A | 6/2014 | | G02B 6/44 |
| EP | 0713114 A1 | 5/1996 | | G02B 6/44 |
| EP | 2717082 A1 | 4/2010 | | G02B 6/44 |
| EP | 2239608 A1 | 10/2010 | | G02B 6/44 |
| FR | 2727213 A1 | 5/1996 | | G02B 6/44 |
| JP | 8-327863 A | 12/1996 | | G02B 6/44 |
| JP | 3685520 B2 | 8/2005 | | G02B 6/44 |
| JP | 2007-279226 A | 10/2007 | | G02B 6/44 |
| JP | 4143651 B2 | 9/2008 | | G02B 6/44 |
| JP | 2009-93077 A | 4/2009 | | G02B 6/44 |
| JP | 2009-163045 A | 7/2009 | | G02B 6/44 |
| JP | 2010-2743 A | 1/2010 | | G02B 6/44 |
| JP | 2010-8923 A | 1/2010 | | G02B 6/44 |
| JP | 2010-117592 A | 5/2010 | | G02B 6/44 |
| JP | 4619424 B2 | 1/2011 | | G02B 6/44 |
| JP | 2011-100115 A | 5/2011 | | G02B 6/44 |
| JP | 2011-169937 A | 9/2011 | | G02B 6/44 |
| JP | 2011-169939 A | 9/2011 | | G02B 6/04 |
| JP | 2011-169940 A | 9/2011 | | G02B 6/04 |
| JP | 2011-221163 A | 11/2011 | | G02B 6/44 |
| JP | 2011-221198 A | 11/2011 | | G02B 6/44 |
| JP | 2011-221199 A | 11/2011 | | G02B 6/44 |
| JP | 2011-221320 A | 11/2011 | | G02B 6/44 |
| JP | 2012-27200 A | 2/2012 | | G02B 6/00 |
| JP | 2012-42354 A | 3/2012 | | G01M 11/00 |
| JP | 2012-42749 A | 3/2012 | | G02B 6/44 |
| JP | 2012-88445 A | 5/2012 | | G02B 6/44 |
| JP | 2012-108331 A | 6/2012 | | G02B 6/44 |
| JP | 4966920 B2 | 7/2012 | | G02B 6/44 |
| JP | 4980841 B2 | 7/2012 | | G02B 6/44 |
| JP | 2012-252198 A | 12/2012 | | G02B 6/44 |
| JP | 2012-252245 A | 12/2012 | | G02B 6/44 |
| JP | 2013-3516 A | 1/2013 | | G02B 6/44 |
| JP | 5117519 B2 | 1/2013 | | G02B 6/44 |
| JP | 2013-50739 A | 3/2013 | | G02B 6/44 |
| JP | 5158893 B2 | 3/2013 | | G02B 6/44 |
| JP | 2013-88617 A | 5/2013 | | G02B 6/44 |
| JP | 5200093 B2 | 5/2013 | | G02B 6/44 |
| JP | 5224403 B2 | 7/2013 | | G02B 6/44 |
| JP | 5235125 B2 | 7/2013 | | G02B 6/44 |
| JP | 5253474 B2 | 7/2013 | | G02B 6/44 |
| JP | 2013-160882 A | 8/2013 | | G02B 6/44 |
| JP | 2013-167753 A | 8/2013 | | G02B 6/44 |
| JP | 2013-182157 A | 9/2013 | | G02B 6/44 |
| JP | 2013-195534 A | 9/2013 | | G02B 6/44 |
| JP | 5291042 B2 | 9/2013 | | G02B 6/44 |
| JP | 2013-205501 A | 10/2013 | | G02B 6/44 |
| JP | 5309098 B2 | 10/2013 | | G02B 6/44 |
| JP | 5309189 B2 | 10/2013 | | G02B 6/44 |
| JP | 5328972 B2 | 10/2013 | | G02B 6/44 |
| JP | 5331165 B2 | 10/2013 | | G02B 6/44 |
| JP | 2013-228647 A | 11/2013 | | G02B 6/44 |
| JP | 2013-238719 A | 11/2013 | | G02B 6/44 |
| JP | 5354751 B2 | 11/2013 | | G02B 6/00 |
| JP | 2013-250466 A | 12/2013 | | G02B 6/44 |
| JP | 2013-257394 A | 12/2013 | | G02B 6/44 |
| JP | 2014-10439 A | 1/2014 | | G02B 6/44 |
| JP | 2014-16528 A | 1/2014 | | G02B 6/44 |
| JP | 2014-16529 A | 1/2014 | | G02B 6/44 |
| JP | 2014-16530 A | 1/2014 | | G02B 6/44 |
| JP | 5380396 B2 | 1/2014 | | G01M 11/00 |
| JP | 5391131 B2 | 1/2014 | | G02B 6/44 |
| JP | 5391296 B2 | 1/2014 | | G02B 6/44 |
| JP | 2014-38146 A | 2/2014 | | G02B 6/44 |
| JP | 5411784 B2 | 2/2014 | | G02B 6/44 |
| JP | 5450687 B2 | 3/2014 | | G02B 6/44 |
| JP | 2014-71441 A | 4/2014 | | G02B 6/44 |
| JP | 2014-74910 A | 4/2014 | | G02B 6/44 |
| JP | 5457528 B1 | 4/2014 | | G02B 6/44 |
| JP | 5469044 B2 | 4/2014 | | G02B 6/44 |
| JP | 2014-85512 A | 5/2014 | | G02B 6/44 |
| JP | 2014-85592 A | 5/2014 | | G02B 6/44 |
| JP | 2014-95560 A | 5/2014 | | G01M 11/00 |
| JP | 5503383 B2 | 5/2014 | | G02B 6/44 |
| KR | 10-2014-0079824 A | 6/2014 | | G02B 6/44 |
| TW | 201142400 A | 12/2011 | | G02B 6/44 |
| TW | 201303404 A | 1/2013 | | G02B 6/44 |
| TW | 201331659 A | 8/2013 | | G02B 6/44 |
| TW | 201333571 A | 8/2013 | | G02B 6/44 |
| TW | 201350950 A | 12/2013 | | G02B 6/44 |
| WO | WO 2009/087911 A1 | 7/2009 | | G02B 6/44 |
| WO | WO 2011/043324 A1 | 4/2011 | | G02B 6/44 |
| WO | WO 2012/023508 A1 | 2/2012 | | G02B 6/44 |
| WO | WO 2012/165371 A1 | 12/2012 | | G02B 6/44 |
| WO | WO 2013/058206 A1 | 4/2013 | | G02B 6/44 |
| WO | WO 2013/065640 A1 | 5/2013 | | G02B 6/44 |
| WO | WO 2013/115307 A1 | 8/2013 | | G02B 6/44 |
| WO | WO 2013/129475 A1 | 9/2013 | | G02B 6/44 |
| WO | WO 2013/165407 A | 11/2013 | | G02B 6/44 |
| WO | WO 2014054129 A1 | 4/2014 | | G02B 6/44 |

* cited by examiner

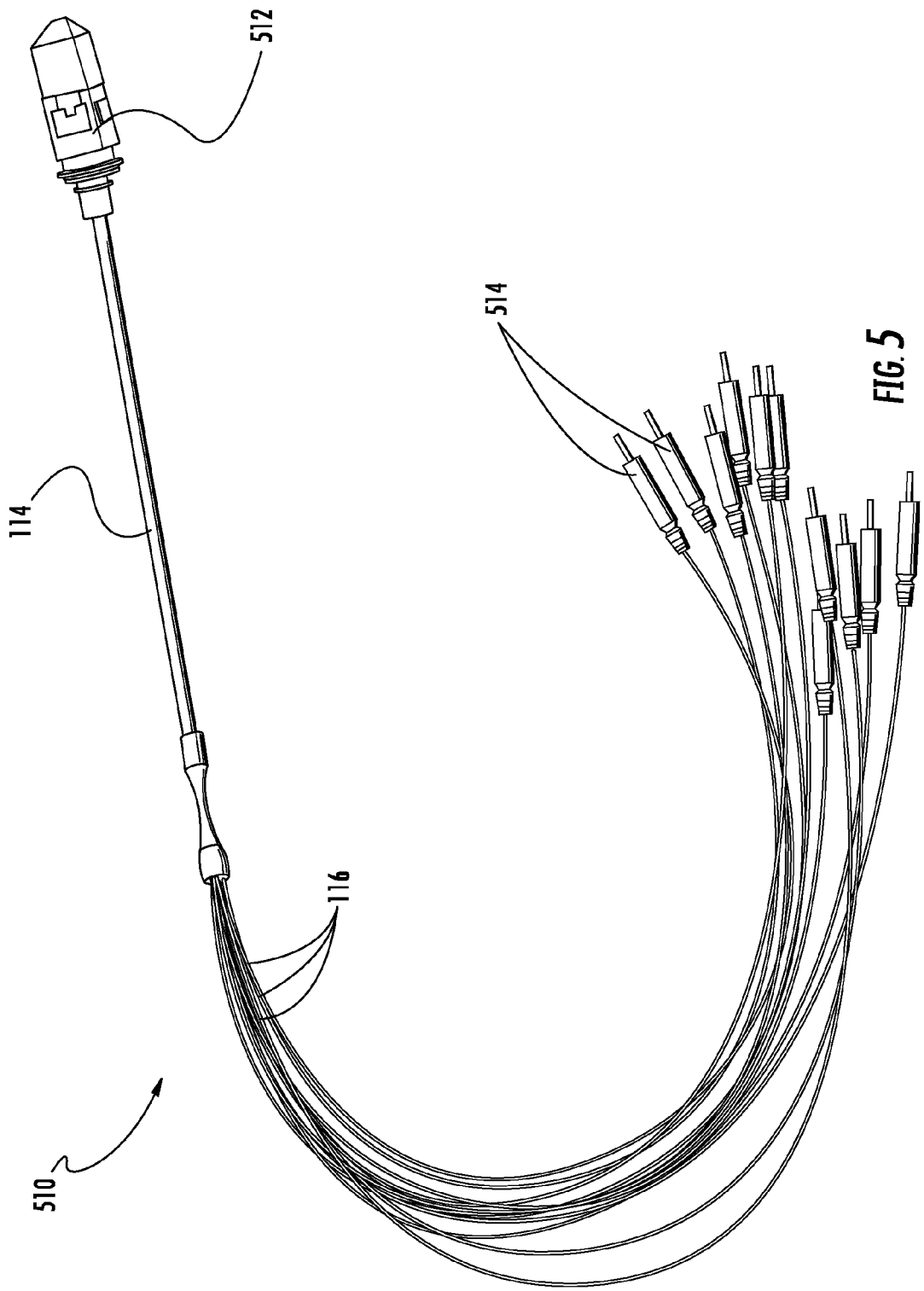

FIBER OPTIC RIBBON CABLE AND RIBBON

RELATED APPLICATIONS

This Application claims the benefit of U.S. Application No. 62/006,950 filed Jun. 3, 2014, which is incorporated herein by reference in its entirety.

BACKGROUND

Aspects of the present disclosure relate generally to fiber optic ribbon cables and fiber optic ribbons.

Fiber optic ribbons are typically arrangements of optical fibers in which the optical fibers are positioned side-by-side with one another and constrained by a common matrix. Such ribbons may be manufactured via pultrusion where the optical fibers are arranged in the side-by-side orientation and drawn through a bath or shower of uncured matrix that is subsequently cured. Within a fiber optic cable, fiber optic ribbons are typically stacked such that the ribbons overlap one another. The stack may be generally rectangular in cross-section and may include several ribbons.

Some fiber optic ribbons are manufactured to include spot or point bonding with matrix, where the matrix connects only two optical fibers of the ribbon at a particular point and discretely connects another two of the optical fibers of the ribbon at a different point. The result is a "roll-able" ribbon, designed to be more flexible and to roll in a buffer tube or cable cavity, as opposed to being stacked. Roll-able ribbons may include less matrix material than more conventional fiber optic ribbons, but such ribbons may be difficult to "connectorize" (i.e., attach to a ferrule of a fiber optic connector) because the fibers of a particular ribbon may not be bonded to one another at any given cross-section of the ribbon, and may thus be hard to quickly or efficiently align and secure in the ferrule.

A need exists for a fiber optic ribbon cable, as well as ribbons that may be used therewith, that are flexible, compact, and/or configured to quickly and efficiently connectorize.

SUMMARY

Some embodiments relate to a fiber optic ribbon cable, which includes a jacket having a cavity and a stack of fiber optic ribbons in the cavity. Each of the fiber optic ribbons includes optical fibers arranged side-by-side with one another and bound to one another with a common matrix in bound sections of the respective fiber optic ribbon. Each fiber optic ribbon additionally has loose sections thereof where the optical fibers of the respective fiber optic ribbon are loose and unbound. The bound sections are spaced apart from one another and separated from one another by the loose sections, while matrix of each of the bound sections contiguously extends across each of the optical fibers of the fiber optic ribbon. Bound sections of adjoining fiber optic ribbons of the stack are at least partially non-overlapping one another as arranged in the stack, which facilitates flexibility and compactness of the stack.

Other embodiments relate to fiber optic ribbon cable, which includes a jacket having a cavity defined therein and a stack of fiber optic ribbons located in the cavity. Each of the fiber optic ribbons includes optical fibers arranged side-by-side with one another and bound to one another with a common matrix in bound sections of the respective fiber optic ribbon. Each fiber optic ribbon additionally has loose sections thereof that are free of the common matrix, where the bound sections are spaced apart from one another and separated from one another by the loose sections. Matrix of each of the bound sections contiguously extends in a generally transverse direction across each of the optical fibers of the fiber optic ribbon. For any 100 randomly selected cross-sections within a 10-meter section of the fiber optic ribbon cable that are orthogonal to a lengthwise axis of the fiber optic ribbon cable, on average the stack of fiber optic ribbons has more loose optical fibers than optical fibers bound to one another at the cross-sections. As such, the optical fibers of the loose sections are configured to move to lower stress positions within the cavity when the cable is in bending.

Still other embodiments relate to a fiber optic ribbon cable, which includes a jacket having a cavity defined therein, strength member embedded in walls of the jacket, and a fiber optic ribbon. The strength members are positioned on opposing sides of the cavity such that the strength members impart a bend preference to the jacket. Accordingly, bending of a free end of a 15 cm cantilevered section of the jacket about a preferential bend axis—defined as extending generally between the strength members and orthogonal to a lengthwise axis of the fiber optic cable—requires a greater bending moment to achieve a deflection of 15° than does bending the jacket about a non-preferential bend axis that is orthogonal to both the preferential bend axis and the lengthwise axis. The fiber optic ribbon includes optical fibers arranged side-by-side with one another and bound to one another with a common matrix in bound sections thereof. The fiber optic ribbon also has loose sections thereof where the optical fibers are loose and unbound. Matrix of each of the bound sections contiguously extends across each of the optical fibers of the fiber optic ribbon and the bound sections are spaced apart from one another and separated from one another by the loose sections. Further, the loose sections are spaced apart from one another and separated from one another by the bound sections. The bound sections of the fiber optic ribbon each have a bend preference and the fiber optic ribbons are positioned in the cavity such that a preferential bend axis of each of the bound sections that is generally parallel with the preferential bend axis of the jacket. Coordination of the preferential bend axes may facilitate controlled bending of the optical fibers and mitigate bending attenuation and stress experienced by the optical fibers of the fiber optic ribbons.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serves to explain principles and operations of the various embodiments. As such, the disclosure will become more fully understood from the following Detailed Description, taken in conjunction with the accompanying Figures, in which:

FIG. 5 is a digital image of a fiber optic assembly according to an exemplary embodiment.

DETAILED DESCRIPTION

Figure 1:
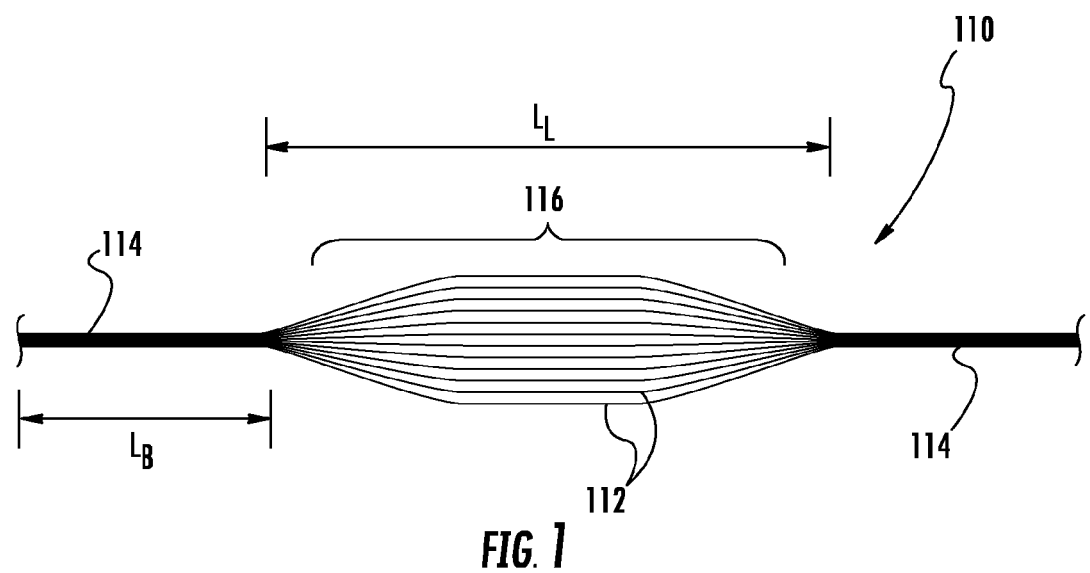
FIG. 1 is a perspective view of a portion of a fiber optic ribbon according to an exemplary embodiment.
Figure 3:
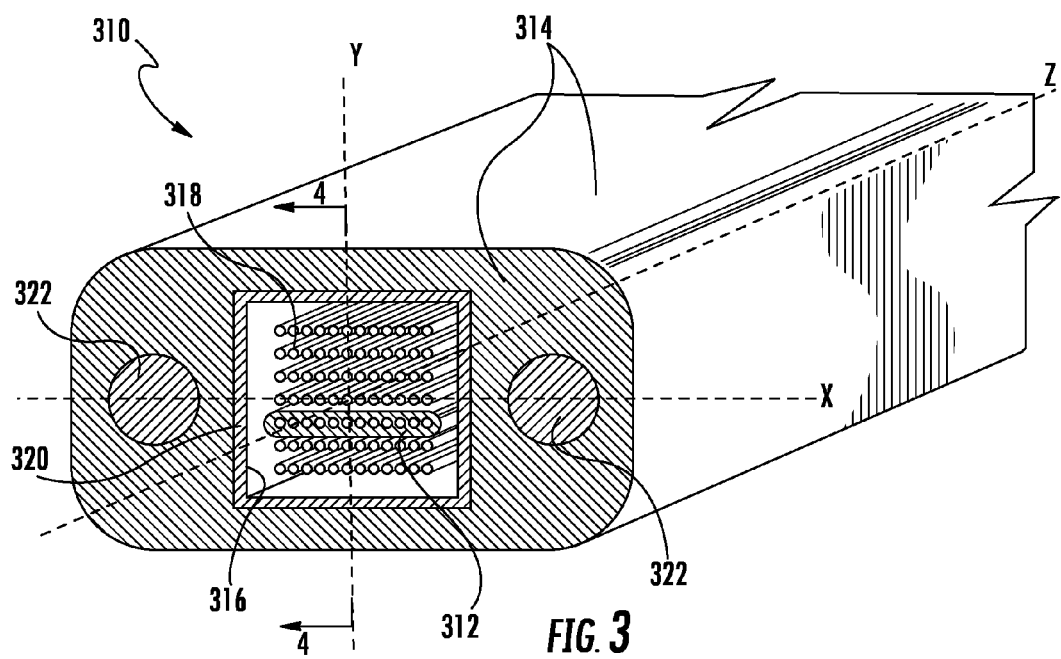
FIG. 3 is a perspective view of a fiber optic ribbon cable shown in cross-section according to an exemplary embodiment.
Figure 4:
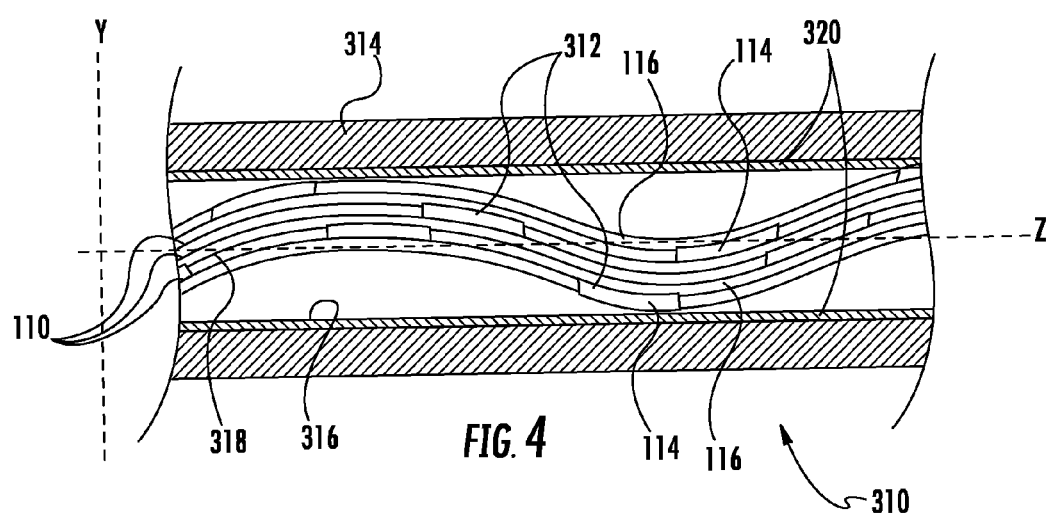
FIG. 4 is a cross-sectional view of the fiber optic cable of FIG. 3 taken along line 4-4 of FIG. 3.

Referring to FIG. 1, a fiber optic ribbon 110 includes optical fibers 112, such as two or more optical fibers 112. The optical fibers 112 may be single-mode, multi-mode, bend-insensitive, multi-core, glass core/cladding, polymeric coated, and/or otherwise structured. According to an exemplary embodiment, the optical fibers 112 of the fiber optic ribbon 110 are arranged side-by-side with one another and bound to one another with a common matrix in bound sections 114 thereof (see, e.g., matrix 312 as shown in FIGS. 3-4). The matrix may be a curable resin, such as ultra-violet light curable acrylate, epoxy, or other materials. The common matrix contiguously surrounds all of the optical fibers 112 in the bound sections 114 and binds the optical fibers 112 to one another in a fixed order. The order may be arranged to correspond to the order of other bound sections 114 of the same fiber optic ribbon 110, such as each bound section 114 having the same position and order for each optical fiber 112 of the fiber optic ribbon 110, thereby facilitating efficient connectorization, without additionally rearranging or sorting the optical fibers 112.

According to an exemplary embodiment, the fiber optic ribbon 110 also has loose sections 116 thereof where the optical fibers 112 are relatively loose and unbound to one another. For example, the loose sections 116 may include little or no common matrix or matrix of the loose sections 116 may be uncured. In some embodiments, the bound sections 114 of the fiber optic ribbon 110 are discretely spaced apart from one another and separated from one another by the loose sections 116. For example, the portion of the fiber optic ribbon 110 shown in FIG. 1 may repeated again and again between bound and loose sections 114, 116 of a longer fiber optic ribbon, in some embodiments. The loose sections 116 of such embodiments may be correspondingly spaced apart from one another and separated from one another by the bound sections 114 (i.e., discrete; not directly or continuously connected to one another).

In some embodiments, the bound sections 114 are much shorter in length $L_B$ than the loose sections 116 are in length $L_L$, such as less than a fifth $L_L$ on average, as shown in FIG. 1, such as $L_B$ being less than a tenth of $L_L$ on average. For example, bound sections 114 may be about 10 cm or less in length $L_B$, on average, while intervening loose sections 116 may be about 1 m or longer in length $L_L$. In some contemplated embodiments, the loose sections 116 may be positioned in buffer tubes or other intermittent housings.

Figure 2:
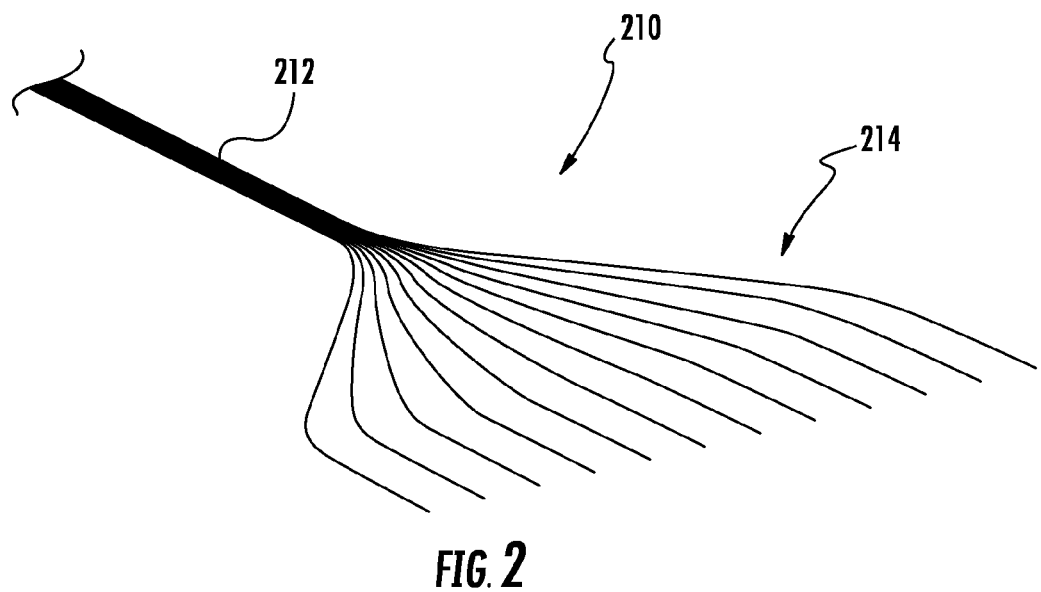
FIG. 2 is a perspective view of a portion of a fiber optic ribbon according to another exemplary embodiment.

In contemplated embodiments, a fiber optic ribbon 210 may include only one bound section and one loose section, as shown in FIG. 2. As such, the fiber optic ribbon 210 may include a bound end 212 (i.e., bound section) and a loose end 214 (i.e., loose section). Such a ribbon 210 may be particularly useful for fiber optic assemblies, such as the assembly 510 shown in FIG. 5, that includes a multi-fiber connector 512 on one end of the assembly 150 and a plurality of single or lesser-fiber connectors 514 on the other end of the assembly 510. The ribbon 210 may be formed by cutting the respective sections 214, 212 from a longer fiber optic ribbon, such as ribbon 110.

Referring now to FIGS. 3-4, a fiber optic ribbon cable 310 includes a jacket 314 having a cavity 316 defined therein and a stack 318 of fiber optic ribbons, such as a plurality of the fiber optic ribbon 110, that are positioned in the cavity 316. In some embodiments, the jacket 314 is elongate in cross-section as shown in FIG. 3, while in other embodiments the jacket may be round in cross-section or otherwise shaped.

The jacket 314 may include, such as primarily include by volume, a polymer, such as a thermoplastic. The polymer may be extruded over or around the stack 318 so that the cavity 316 is formed directly around the stack 318. In other embodiments, the stack 318 may be positioned in a buffer tube or other sheathing, which itself may be located in the cavity 316 of the jacket 314. The polymer may be polyethylene, polyvinyl chloride, a low-smoke-zero-halogen material, or other polymers.

In some embodiments, the polymer is a flame-retardant material, such as including flame-retardant fillers, such as aluminum hydroxide, magnesium hydroxide, or other materials. Flame-retardant cables (indoor cables) may particularly benefit from the technology disclosed herein because the fiber optic ribbons may have less matrix than conventional ribbons and may therefore contain less fuel for combustion and/or smoke. The fiber optic ribbon cable may include additional components, such as a component 320 between the cavity 316 and the jacket 314, such as a tape (e.g., water-swellable tape, mica tape, flame-retardant tape) or armor (e.g., corrugated steel), or other components.

In some embodiments, the fiber optic ribbon cable 310 includes strength members. The strength members may be in the form of rods 322 (e.g., rigid, cylindrical rods) that are embedded in the jacket 314, such as steel rods or rods of glass-reinforced plastic. The rods 322 may be alone as shown in FIG. 3, arranged in pairs on either side of the cavity, or otherwise grouped, numbered, or arranged. In other contemplated embodiments, cables employing technology disclosed may include or further include tensile yarn as strength members, such as fiberglass yarn or aramid yarn as strength members. Such tensile yarn may be positioned in the cavity 316, such as between the ribbon stack 318 and the jacket 314. In some embodiments, cables employing technology disclosed herein may not have a bend preference, such as with indoor cables round in cross-section (exterior periphery) using only tensile yarn a strength members.

Referring again to FIG. 3, the rods 322 are positioned on opposing sides of the cavity 316 and contribute to a bend preference of the fiber optic ribbon cable 310. For example, the cable 310 includes a preferential bend axis X extending generally through the strength members and orthogonal to a lengthwise axis Z of the cable. The cable further includes a non-preferential bend axis Y orthogonal to both the preferential bend axis X and the lengthwise axis Z of the cable 310. Bending of a free end of a 15 cm cantilevered section of the jacket 314 about the preferential bend axis X requires a greater bending moment to achieve a deflection of 15° of the free end of the cantilevered section relative to the fixed end thereof than does bending the jacket 314 about the non-preferential bend axis Y, such as at least twice the load, at least three times the load.

Referring now to FIG. 4, the ribbon stack 318 undulates within the cavity 316 along the length of the fiber optic cable 310. This undulation provides extra length for optical fibers of the stack 318, allowing the cable 310 to be stretched, to a point, without straining the optical fibers. In some embodiments, the optical fibers of the ribbon stack 318, on average, are at least 0.2% longer than the respective sheathing element in which they are most directly located (e.g., jacket, buffer tube, etc.), and/or no more than 2% longer. In other embodiments, the stack 318 is helically twisted within the cavity 316, where the twist facilitates bending of the respective cable 310.

As shown in FIG. 4, bound sections 114 of adjoining (e.g., contacting or immediately adjacent) fiber optic ribbons 110 of the stack 318 are at least partially (e.g., completely) non-overlapping one another as arranged in the stack 318, which facilitating flexibility and compactness of the stack 318. Further, for a 10-meter section of the fiber optic ribbon cable 310, for any 100 randomly selected cross-sections within the 10-meter section that are orthogonal to a lengthwise axis Z of the fiber optic ribbon cable 310, on average the stack 318 of fiber optic ribbons 310 has more loose optical fibers than optical fibers bound to one another at the cross-sections. FIG. 3 shows an example of such a cross-section. (In testing of random cross-sections, cross-sections may be selected by random number generator scaled to 10 meters.) As such, the optical fibers of the loose sections 116 are configured to move to lower stress positions within the cavity 316 when the cable 310 is in bending. For example, loose optical fibers of different ribbons in the stack 318 may intermesh with one another as the cable 310 is bending.

According to an exemplary embodiment, the bound sections 114 of the fiber optic ribbons 110 of the stack 318 of the cable 310 also have a bend preference, due to the geometry of the respective ribbons 110. In some embodiments, the axis of preferential bending of the bound sections 114 of the ribbons 110 is aligned (e.g., generally parallel; within 15-degrees of parallel to one another) with the preferential bend axis X of the jacket 314. Alignment of the preferential bend axes is intended to reduce stresses on optical fibers of the fiber optic ribbons 110 and thereby reduce attenuation losses of the fiber optic cable 310.

In contemplated embodiments, the fiber optic ribbons 110 may be manufactured by discretely pulsing a spray or bath of matrix over the optical fibers 112 as the optical fibers 112 are drawn along a manufacturing line, and then curing that matrix. A quick valve may be used to control the flow of matrix. Alternatively, the matrix may be applied by a rotating wheel or cylinder that releases matrix onto the optical fibers 112 over an arc of the wheel or cylinder. In still other contemplated manufacturing processes, the entire length of optical fibers may be coated with ribbon matrix, but only portions thereof may be then cured. In other contemplated embodiments, an ink jet printer prints ribbon matrix into discrete sections of the optical fibers 112 to form the bound sections 114.

In some contemplated embodiments, the matrix can be applied as in conventional ribbon processes and the UV light to cure it can be applied intermittently. For example, a discrete, high intensity source such as a laser can be employed to provide a strong differentiation between cured and uncured portions. The uncured material may then be subsequently removed either in a solvent bath or by mechanical wiping, a combination of the two, or otherwise. Optionally a second, continuous curing step may then be employed to fully cure any semi-cured material.

In other embodiments, instead of the optical fibers passing through a tool for matrix coverage, an oscillating press could apply the matrix to the optical fibers. This would also support and enable the ability to vary lengths for the ribbon sections.

In still other embodiments, the matrix or ribbon material could be applied in powder form and cured by heat or laser, such as by 3-D Selective Laser Sintering technology, which may provide a more controlled application and limit the matrix from carrying over to loose sections 116. As part of the manufacturing process, unused powder may be blown off of the loose sections 116 and recycled.

The construction and arrangements of the fiber optic ribbon cables and ribbons, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive and innovative technology.

What is claimed is:

1. A fiber optic ribbon cable comprising a jacket, having a cavity defined therein, and a stack of fiber optic ribbons located in the cavity, wherein:
   each of the fiber optic ribbons comprises optical fibers arranged side-by-side with one another and bound to one another with a common matrix in bound sections of the respective fiber optic ribbon,
   each fiber optic ribbon additionally has loose sections thereof where the optical fibers of the respective fiber optic ribbon are loose and unbound,
   matrix of each of the bound sections contiguously extends across each of the optical fibers of the fiber optic ribbon;
   the bound sections are spaced apart from one another and separated from one another by the loose sections; and
   bound sections of adjoining fiber optic ribbons of the stack are at least partially non-overlapping one another as arranged in the stack, thereby facilitating flexibility and compactness of the stack.

2. The cable of claim 1, wherein the optical fibers of the fiber optic ribbon are arranged in the same order relative to one another in each bound section.

3. The cable of claim 1, wherein the stack of fiber optic ribbons has more loose optical fibers than optical fibers bound to one another within a 10 meter section of the fiber optic ribbon cable.

4. The cable of claim 1, wherein bound sections of adjoining fiber optic ribbons of the stack are completely non-overlapping one another as arranged in the stack.

5. The cable of claim 1, wherein an average length of the loose sections of each of the fiber optic ribbons are at least twice an average length of the bound sections thereof.

6. The cable of claim 1, wherein the jacket is formed from a flame-retardant material.

7. The cable of claim 6, wherein the jacket comprises at least one of aluminum hydroxide and magnesium hydroxide.

8. The cable of claim 6, further comprising a tape surrounding the stack of fiber optic ribbons, and wherein the tape is a flame-retardant tape.

9. A fiber optic ribbon cable, comprising:
   a jacket having a cavity defined therein; and
   a stack of fiber optic ribbons located in the cavity,
      wherein each of the fiber optic ribbons comprises optical fibers arranged side-by-side with one another and bound to one another with a common matrix in bound sections of the respective fiber optic ribbon, wherein each fiber optic ribbon additionally has loose sections thereof free of the common matrix, wherein matrix of each of the bound sections contiguously extends in a generally transverse direction across each of the optical fibers of the fiber optic ribbon;

wherein the bound sections are spaced apart from one another and separated from one another by the loose sections; and wherein the stack of fiber optic ribbons has more loose optical fibers than optical fibers bound to one another within a 10 meter section of fiber optic ribbon cable, whereby the optical fibers of the loose sections are configured to move to lower stress positions within the cavity when the fiber optic ribbon cable is in bending.

10. The cable of claim 9, wherein the optical fibers of the fiber optic ribbon are arranged in the same order relative to one another in each bound section.

11. The cable of claim 9, wherein the jacket is formed from a flame-retardant material.

12. The cable of claim 11, wherein the jacket comprises at least one of aluminum hydroxide and magnesium hydroxide, the fiber optic ribbon cable further comprising a tape surrounding the stack of fiber optic ribbons.

13. The cable of claim 12, wherein the tape is a flame-retardant tape.

14. The cable of claim 9, wherein the bound sections of adjoining fiber optic ribbons of the stack are at least partially non-overlapping one another as arranged in the stack.

15. A fiber optic ribbon cable, comprising:

a jacket having a cavity defined therein;

strength members embedded in walls of the jacket, wherein the strength members are positioned on opposing sides of the cavity such that the strength members impart a bend preference to the jacket where bending of a free end of a 15 cm cantilevered section of the jacket about a preferential bend axis thereof, extending generally between the strength members and orthogonal to a lengthwise axis of the fiber optic cable, requires a greater bending moment to achieve a deflection of 15° than does bending the jacket about a non-preferential bend axis that is orthogonal to both the preferential bend axis and the lengthwise axis; and a fiber optic ribbon comprising optical fibers arranged side-by-side with one another and bound to one another with a common matrix in bound sections thereof, wherein the fiber optic ribbon has loose sections thereof where the optical fibers are loose and unbound, wherein matrix of each of the bound sections contiguously extends across each of the optical fibers of the fiber optic ribbon;

wherein the bound sections are spaced apart from one another and separated from one another by the loose sections, wherein the loose sections are spaced apart from one another and separated from one another by the bound sections;

wherein the bound sections of the fiber optic ribbon each have a bend preference and wherein the fiber optic ribbons are positioned in the cavity such that a preferential bend axis of the bound sections is within 15° of parallel with the preferential bend axis of the jacket.

16. The cable of claim 15, wherein the fiber optic ribbon is one of a plurality of such fiber optic ribbons in a stack located in the cavity, and wherein bound sections of adjoining fiber optic ribbons of the stack are at least partially non-overlapping one another.

17. The cable of claim 15, wherein the optical fibers of the fiber optic ribbon are arranged in the same order relative to one another in each bound section.

18. The cable of claim 15, wherein the stack of fiber optic ribbons has more loose optical fibers than optical fibers bound to one another within a 10 meter section of the fiber optic ribbon cable.

19. The cable of claim 15, wherein the jacket is formed from a flame-retardant material.

20. The cable of claim 19, further comprising a tape surrounding the fiber optic ribbon, and wherein the tape is a flame-retardant tape.

* * * * *